United States Patent
Weinmeier et al.

[19]

[11] Patent Number: 5,612,858
[45] Date of Patent: Mar. 18, 1997

[54] FLYBACK CONVERTER

[75] Inventors: Harald Weinmeier, Vienna; Eduard Schober, Achau, both of Austria

[73] Assignee: Siemens Aktiengesellschaft, Munich, Germany

[21] Appl. No.: 619,741

[22] PCT Filed: Sep. 26, 1994

[86] PCT No.: PCT/EP94/03198

§ 371 Date: Jul. 1, 1996

§ 102(e) Date: Jul. 1, 1996

[87] PCT Pub. No.: WO95/09476

PCT Pub. Date: Apr. 6, 1995

[30] Foreign Application Priority Data

Sep. 27, 1993 [AT] Austria ...................... 1946/93

[51] Int. Cl.$^6$ ................................... H02M 3/335
[52] U.S. Cl. ................... 363/21; 363/56; 363/97
[58] Field of Search .................... 363/20, 21, 56, 363/79, 80, 97, 131; 323/288; 327/172

[56] References Cited

U.S. PATENT DOCUMENTS

| | | | |
|---|---|---|---|
| 3,909,696 | 9/1975 | Katou et al. | 363/21 |
| 4,302,803 | 11/1981 | Shelly | 363/20 |
| 5,005,112 | 4/1995 | Kuriyama | 363/21 |
| 5,408,401 | 4/1995 | Miyazaki | 363/21 |
| 5,408,402 | 4/1995 | Nonnenmacher | 363/21 |
| 5,453,921 | 9/1995 | Shutts | 363/21 |
| 5,499,184 | 3/1996 | Squibb | 363/100 |
| 5,528,483 | 6/1996 | Mohands | 363/21 |
| 5,532,918 | 7/1996 | Mayrand et al. | 363/89 |

FOREIGN PATENT DOCUMENTS

| | | |
|---|---|---|
| 0498917 | 8/1992 | European Pat. Off. . |
| 4002042 | 8/1990 | Germany . |
| 4112855 | 4/1991 | Germany . |
| 4150763 | 5/1992 | Japan . |

OTHER PUBLICATIONS

Rge Revue Generale de l'Electricite, No. 5, May 1995, Paris, pp. 117–123, XP290947, Lhermite 'Un controleur d'alimentation fly-back avec controle efficace des surcharges'.

Primary Examiner—Peter S. Wong
Assistant Examiner—Adolf Berhane
Attorney, Agent, or Firm—Kenyon & Kenyon

[57] ABSTRACT

A flyback converter has a transformer with a primary winding and at least one secondary winding, with a switch driven by a driving circuit, through which an input direct voltage is applied to the primary winding, with a rectifier and a load capacitor for producing an output direct voltage connected downstream from the secondary winding and a current sensor for the current flowing through the primary winding, the duty factor of the driving signal of the driven switch being dependent, on the one hand, on the deviation of the output direct voltage from its set value and, on the other hand, on the output signal of the current sensor. A maximum value is established for the set value of the primary current, up to which point regulation of the output direct voltage takes place, and where the clock frequency of the driving signal of the driven switch can be varied in direct proportion to the output direct voltage.

7 Claims, 5 Drawing Sheets

FLYBACK CONVERTER

FIELD OF THE INVENTION

The present invention relates to a flyback converter.

BACKGROUND INFORMATION

It is known to operate flyback converters at a fixed clock frequency, but the duty factor is regulated as a function of the output direct voltage. For this purpose, a voltage of a current sensor (usually a low-resistance measuring resistor), which is proportional to the current flowing through the primary winding, is compared to the deviation of the output direct voltage. As soon as the current flowing through the primary winding exceeds the value determined by the said deviation, the driven switch is opened. A triangular current is produced in the primary winding. An increase or decrease in the output direct current is compensated for by a decrease or increase, respectively, in the duty factor of the current flowing through the primary winding.

In order to limit the output direct current in the case of overload or short-circuit, in the prior art fixed-frequency flyback converters the output current is measured using a measuring resistor, the measured actual value is compared to a reference value and the difference resulting from this comparison is superimposed on the deviation of the output direct voltage when the output current exceeds a given value. This also results in a decrease in the duty ratio and consequently a current limitation. A diagram according to this state of the art is shown in FIG. 1. This current limitation solution is relatively complicated, as it requires a dedicated current regulator and a relatively expensive measuring resistor $R_2$ capable of withstanding high loads in order to measure the output direct current $I_A$.

A clock controlled converter with current limitation is shown in the European Patent No. 0 498 917, which is a "forward" type converter containing a first means for current limitation through current-dependent time reduction of the switch-on pulses, which operates in the range of the usual values of the current to be limited. This clock-controlled converter includes a second means of current limitation, which operates only in the upper range of the current to be limited and, depending on an output direct voltage, causes the switching frequency with which the switching pulses follow one another to decrease as the current increases.

Freely oscillating flyback converters, unlike fixed-frequency flyback converters, can be easily designed with automatic current limitation. Yet the well-known disadvantages of the freely oscillating flyback converters such as poor open circuit protection, undefined EMC relationships, etc., are unacceptable for most applications.

Therefore, one of the objects of the invention is to provide a flyback converter of the aforementioned type having all the advantages of a fixed-frequency flyback converter, and in which current limitation can be achieved in a simple and inexpensive manner.

SUMMARY OF THE INVENTION

The present invention relates to a flyback converter with a converter having a primary winding and at least one secondary winding, with a switch driven by a driver circuit, through which switch an input direct voltage is applied to the primary winding, with a rectifier and a load capacitor to produce an output direct voltage connected downstream from the secondary winding, and with a current sensor for the current flowing through the primary winding, with the duty factor of the driving signal of the driven switch depending, on the one hand, on the deviation of the output direct voltage from its set value and, on the other hand, on the output signal of the current sensor.

The aforementioned object of the present invention is achieved with a flyback converter by establishing a maximum for the set value of the primary current up to which the output direct current can be regulated, and by making the clock frequency of the driving signal of the driven switch directly proportional to the output direct voltage.

In the case of an overload requiring current limitation, the converter according to the present invention results in an advantageous reduction in the switching frequency and thus in the desired current limitation.

DETAILED DESCRIPTION

Figure 1:
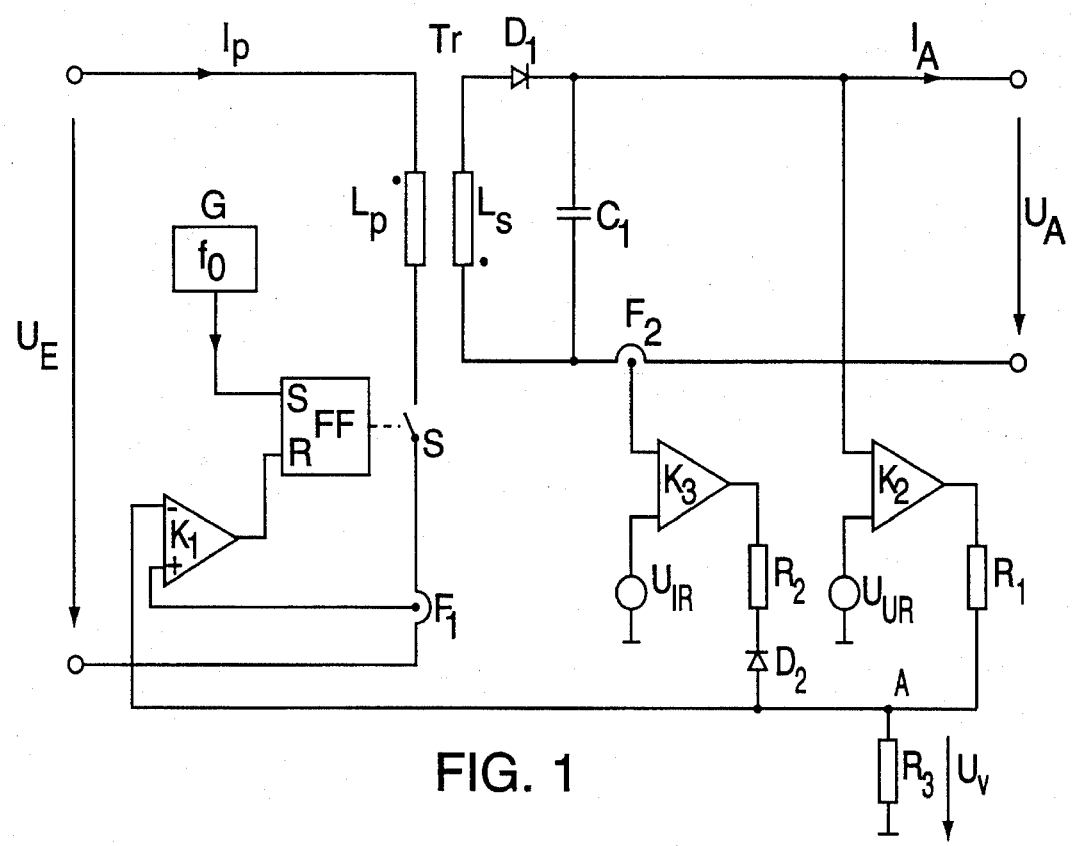
FIG. 1 illustrates a diagram of a prior art flyback converter.

The prior art flyback converter shown in FIG. 1 has a converter $T_r$ with a primary winding (coil) $L_p$ and a secondary winding $L_s$, with the primary winding $L_p$ being at an input direct voltage $U_E$ through a driven switch S. Switch S, which is for example, an n-channel FET transistor, is driven by a driving circuit, which in the present case has a flip-flop FF, whose output drives switch S and at whose set input there is applied a switching voltage of a clock G with constant frequency $f_0$. The output of an operation amplifier $K_1$ is connected to the reset input of flip-flop FF. The output signal of a current sensor $F_1$ is supplied to one input of operation amplifier $K_1$ and a reference voltage $U_v$, depending on the output voltages of two operation amplifiers $K_2$, $K_3$, is applied to the other input.

On the secondary side, a rectifier $D_1$ and a load capacitor $C_1$, to which output direct voltage $U_A$ is applied, is connected downstream from secondary coil $L_S$. Output direct voltage $U_A$ or a proportional portion of it, is compared to a reference voltage $U_{UR}$ in operational amplifier $K_2$. Output current $I_A$, measured with a current sensor $F_2$, is compared, preferably in the form of a voltage proportional to this current, in operational amplifier $K_3$ to another reference voltage $U_{IR}$. The outputs of operational amplifiers $K_2$ and $K_3$ are added at a circuit point A through a resistor $R_1$, and a resistor $R_2$ with a diode $D_2$ connected in series, respectively. Circuit point A is at a fixed potential, e.g., at ground potential, through a resistor $R_3$. This point A is at the aforementioned reference voltage $U_v$ for one of the inputs of operational amplifier $K_1$.

Figure 4A:
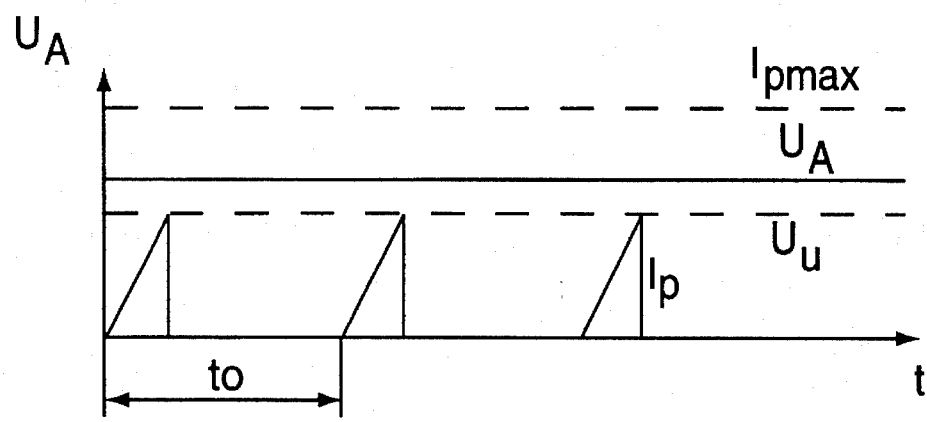
FIG. 4a illustrates the current and voltage variation curves of a flyback converter according to the prior art flyback converter, as shown in FIG. 1.

This prior art circuit illustrated in FIG. 1 operates as follows:

Triggered by a signal of clock G, flip-flop FF closes switch S and, through primary winding $L_p$, a primary current $I_p$ starts flowing with a basically linear rise (FIG. 4a). Current $I_p$ flows until the voltage proportional to it at the input of operational amplifier $K_1$ reaches the value of reference voltage $U_v$. When this value is reached, flip-flop FF is reset by operational amplifier $K_1$ and switch $S_1$ is opened. Switch $S_1$ is closed again through generator (clock) G and flip-flop FF after a time corresponding to a period $f_0$, after its last closing, so that the triangular current illustrated in FIG. 4a is obtained.

A decrease/increase of reference voltage $U_v$ results in a decrease/increase of the duty factor, which is used for voltage regulation (through operational amplifier $K_2$) or current limitation (through operational amplifier $K_2$). In normal operation, output voltage $U_A$ is regulated. Operational amplifier $K_3$ intervenes in the regulation by reducing the duty factor of primary current $I_p$ and limiting the current to $I_{Amax}$ despite the excessive load only after a maximum current $I_{Amax}$, established by the potential ratios at the output of operational amplifier $K_3$ and at point A, is reached.

Figure 2:
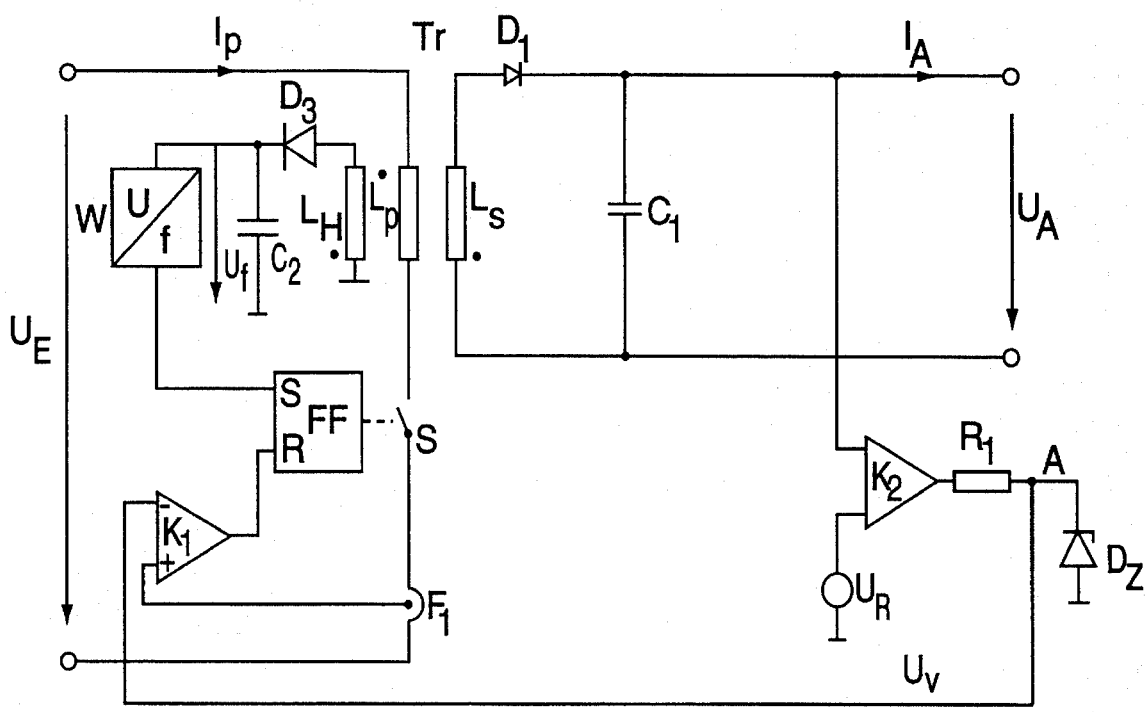
FIG. 2 illustrates diagram of one embodiment of the present invention.

The circuit according to an embodiment of the present invention shown in FIG. 2 is based on the circuit described above and illustrated in FIG. 1, with characteristic differences between the circuit designs of the prior art and the present invention being described below. The same circuit components are designated with the same symbols.

In this embodiment of the present invention, it is preferable that clock frequency f be changed or corrected for current limitation. A voltage/frequency converter W, to whose input a voltage $U_f=k*U_A$, proportional to output voltage $U_A$, is applied, can be advantageously used for this purpose. In this embodiment of the present invention voltage $U_f$ is advantageously obtained from an auxiliary winding $L_H$ of converter $T_r$ by rectification through a diode $D_3$ with a load capacitor $C_2$ connected downstream. Voltage $U_f$ is directly proportional to output direct voltage $U_A$ according to the reduction ratios of windings $L_S$ and $L_H$.

On the secondary side of the converter, the operational amplifier $K_3$, together with current sensor $F_2$ for measuring output current $I_A$, can be advantageously omitted in the circuit according to the invention, as shown in FIG. 2. Thus only operational amplifier $K_2$ is present, whose output is connected to circuit point A through resistor $R_1$. A voltage $U_v$ is applied to this point, as in FIG. 1 as reference voltage $U_v$ for operational amplifier $K_3$ now missing. This voltage is limited (in the positive direction) by a Zener diode $D_z$.

The circuit of this embodiment of the present invention operates as follows:

In normal operation without overcurrent, operational amplifier $K_2$ determines, through $U_v$ and $K_1$, the duty factor of driven switch S. Clock frequency f is proportional to voltage $U_f$ at load capacitor $C_2$. Since $U_A$ is constant in normal operation, $U_f$ is also constant and thus clock frequency f is constant with $f=f_0$.

As the load increases, i.e., as primary current $I_p$ increases, the duty factor is increased through the regulation in order to keep output direct voltage $U_A$ constant. When a value $I_{Pmax}$ of primary current $I_p$ is exceeded, this value being advantageously determined in this embodiment of the present invention by a Zener diode $D_z$, current limitation takes place. Switch S is opened even if a greater duty ratio should be selected through the voltage regulation.

Due to $$I_P=(U_E/L)*t_E$$

where $t_E$ is the switch-on time of switch S and $I_p=0$ at the time when switch S is closed, the set value $I_{Pmax}$ is exceeded starting with a certain output current $I_A$ and switch-on time $t_E$ is limited. Thus the maximum power that can be transmitted is also limited due to $$P_{max}=[(I_{Pmax}^2*L)/2]*f,$$

where L is the main inductance of converter $T_r$.

When the load further increases, i.e., primary current $I_p$ continues to rise, output voltage $U_A$ and voltage $U_f$ drop. Frequency f drops accordingly, e.g. to $f_1$.

Thus $P_{max}$ decreases proportionally to output voltage $U_A$. Due to this proportionality and to $$P_{max}=U_A*I_{Amax},$$

$I_{Amax}$ must be constant in current limiting operation, so that in current limiting operation the output current is constant and equal to $I_{Amax}$ and is independent of the load-dependent output voltage.

Figure 4B:
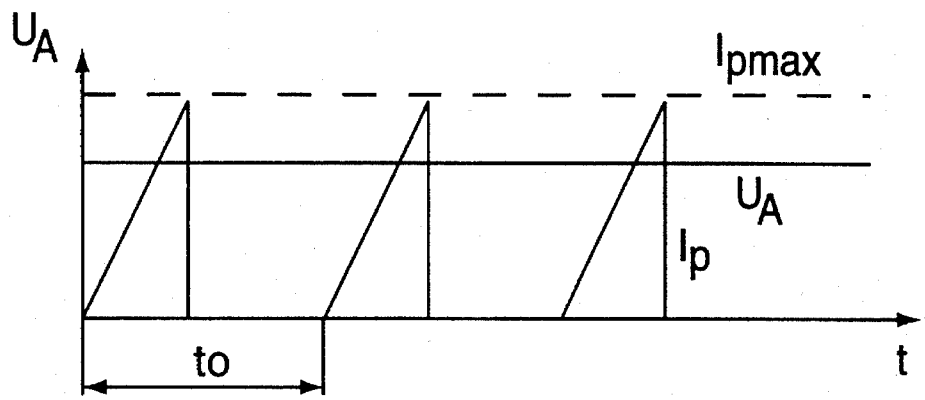
FIG. 4b illustrates the current and voltage variation curves of a flyback converter of the flyback converter according to one embodiment of the present invention.

FIG. 4b shows the variation of $I_P$ at the boundary of normal operation with current limiting operation. The maximum current $I_{Pmax}$ has been reached and the output voltage still has its set value $U_{Asoll}$.

Figure 4C:
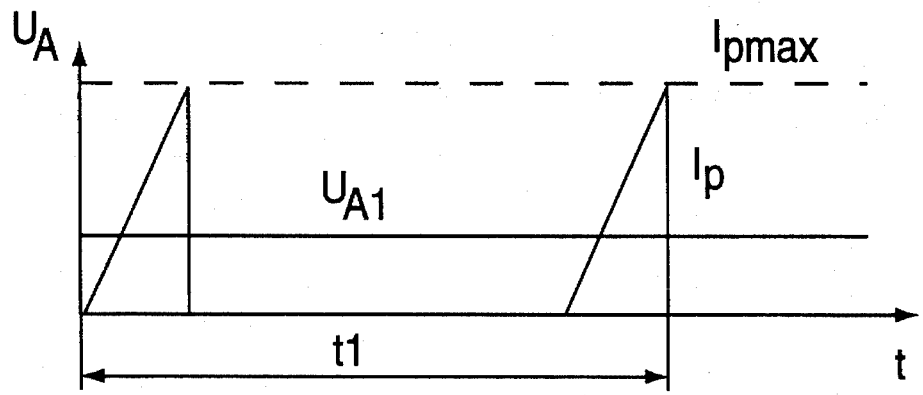
FIG. 4c illustrates the current and voltage variation curves of a flyback converter of the flyback converter according to another embodiment of the present invention.

FIG. 4c shows the relationships in current limiting operation, where $U_A$ has dropped below set value $U_{A1}$; $U_{A1}$ is shown here with $U_{A1}=U_{asoll}/2$. Accordingly, the clock frequency has dropped to $f_1=f_0/2$ ($f_1=1/t_1$).

Figure 3:
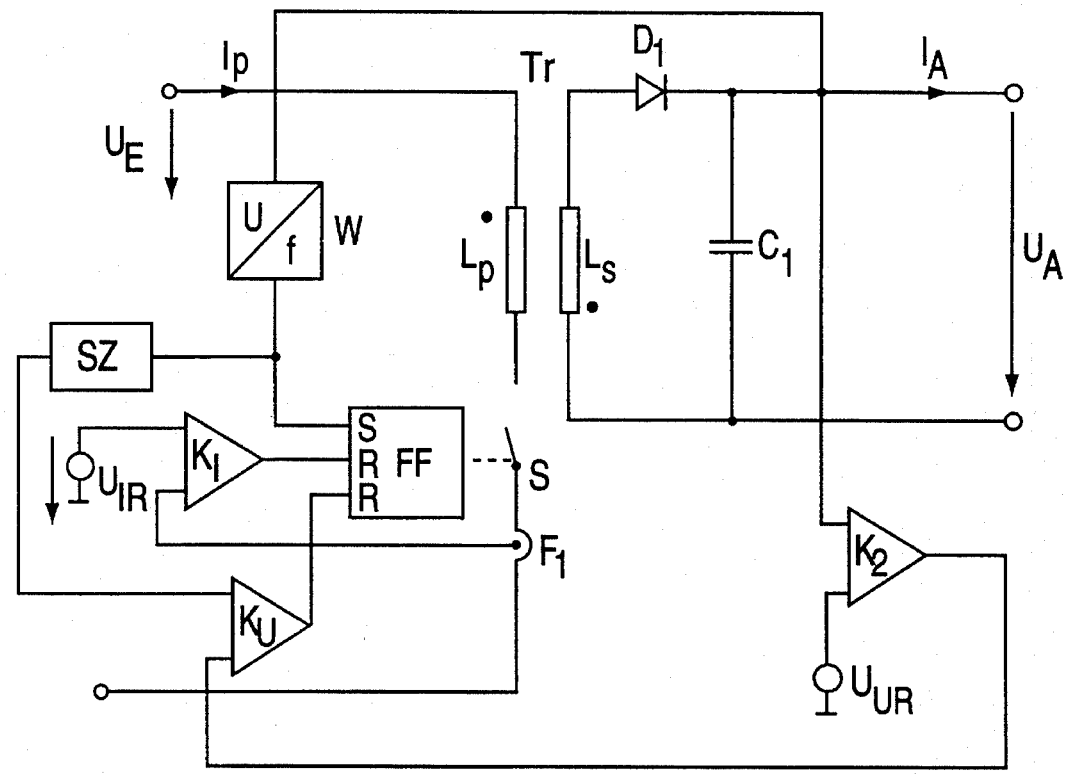
FIG. 3 illustrates diagram of another embodiment of the present invention.

Another embodiment of the present invention is shown in FIG. 3. Output direct voltage $U_A$ is supplied directly to voltage/frequency converter W as an input voltage. The output of voltage/frequency converter W controls, on the one hand, flip-flop FF at its set input and, on the other hand, synchronizes a saw-tooth generator SZ, which supplies a saw-tooth reference voltage for an input of a voltage comparator or operational amplifier $K_U$. The output voltage of the operational amplifier $K_{2T}$, i.e., the deviation of output direct voltage $U_A$, is applied to the other input. The output of operational amplifier $K_U$ is connected to a second reset input of flip-flop FF.

The first reset input of flip-flop FF is at the output of a current comparator or operational amplifier $K_I$, which compares the output signal of current sensor $F_1$ with a reference voltage $U_{IR}$, representing maximum current $I_{Pmax}$.

In the case of normal operation, output direct voltage $U_A$ is regulated through $K_2$ and $K_U$, with the time of opening of switch S being determined by the point of intersection of the saw-tooth signal with the deviation of the output direct voltage. In the case of excessive load, i.e., when a maximum current $I_{Pmax}$ is reached, flip-flop FF is reset at the first reset input through $K_I$ and the mode described in connection with FIG. 2 as current limiting operation sets in, i.e., current limitation with priority over voltage regulation and, as a result, a decrease in clock frequency f.

Figure 5:
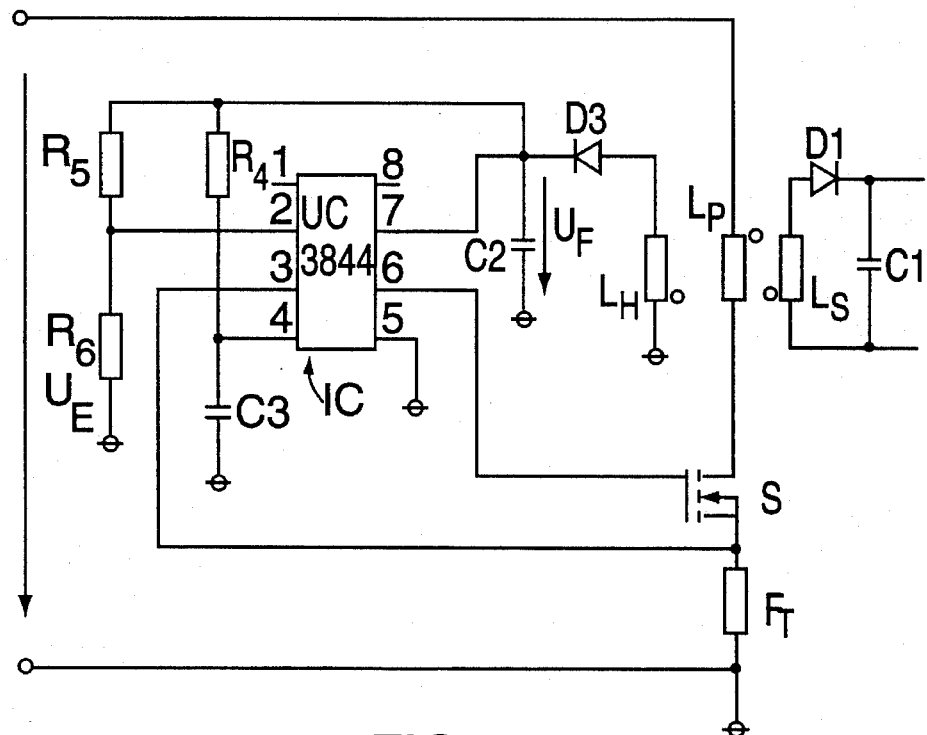
FIG. 5 illustrates yet another embodiment of the present invention using a commercially available integrated circuit.

FIG. 5 shows yet another embodiment of the present invention with the use of an integrated circuit; in the present case an IC by Unitrode, UC 3844, Current Mode PWW integrated circuits can also be used. In principle, the circuit in FIG. 5 is implemented with an embodiment of the present invention, shown in FIG. 2.

Figure 6:
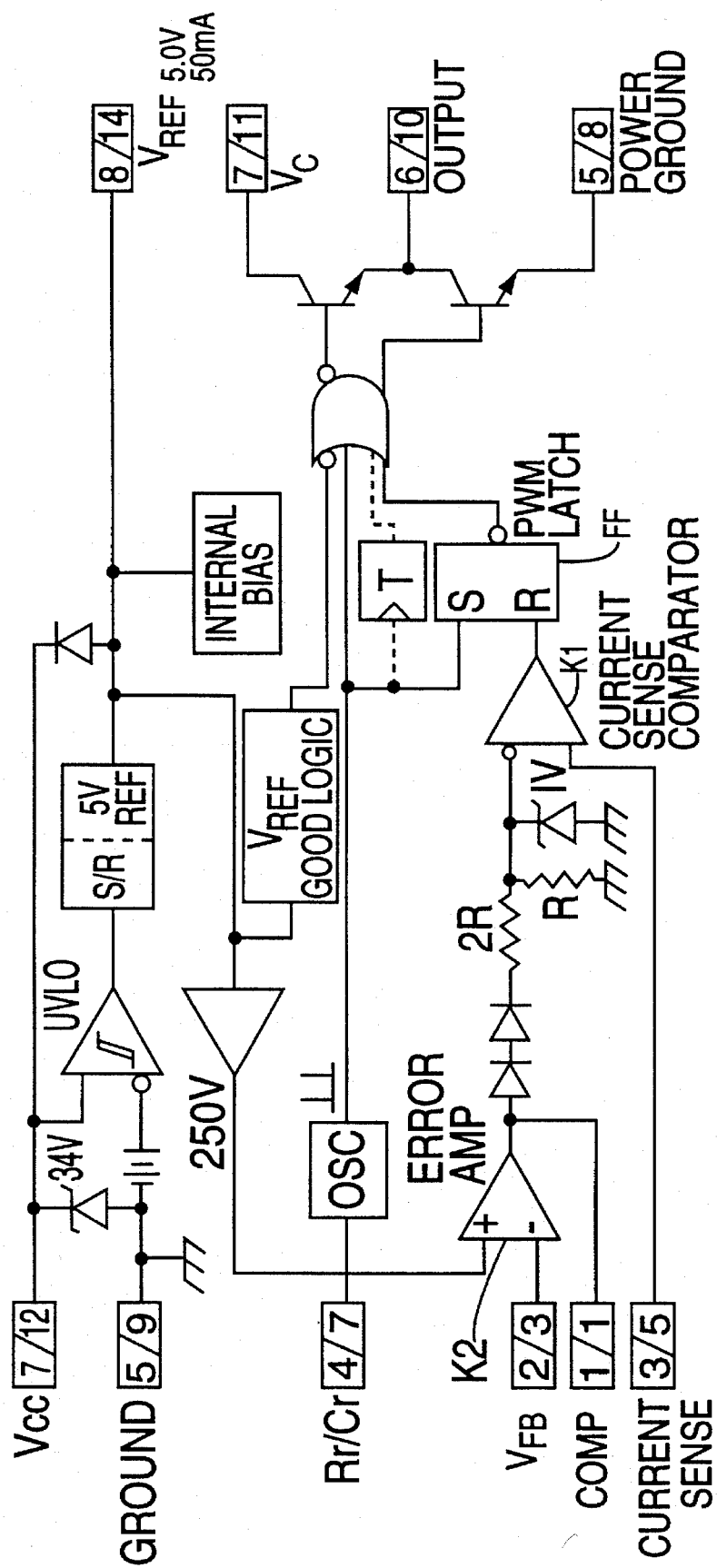
FIG. 6 illustrates a diagram of the integrated circuit for the embodiment of the present invention, as shown in FIG. 5.

The IC contains operational amplifiers $K_1$ and $K_2$, as well as flip-flop $F_f$ (see block diagram in FIG. 6). The output voltage is regulated through voltage $U_F$. applied to auxiliary winding $L_H$, which is directly proportional to output voltage $U_A$. Voltage dividing resistors $R_5/R_6$ produce an appropriate input voltage for operational amplifier $K_2$ on pin 2.

The oscillator of the IC is used, unlike the prior art application circuits, as a base module of the voltage/frequency converter. In prior art circuits the oscillator has a fixed frequency or is synchronized to an external clock frequency. The oscillator input on pin 4 leads to capacitor $C_2$, i.e., $U_f$ through a resistor $R_4$, and pin 4 is connected to ground through a capacitor $C_3$, as shown in FIGS. 5 and 6. The principle of the oscillator consists of switching on a higher negative current on pin 4 when an upper threshold value is exceeded on pin 4. This current is switched off again after the current drops below the lower threshold value; at the same time flip-flop FF is set and a new clock period is started.

The circuit of FIG. 5 tentatively provides a voltage/frequency converter on pin 4. Capacitor $C_3$ is loaded through resistor $R_4$. When the upper threshold value $U_{SO}$ is reached, capacitor $C_3$ is discharged very quickly and the clock period restarts. The current through $R_4$ is approximately proportional to $U_f$ (and to $U_A$) and thus so is the voltage increase in capacitor $C_3$. Therefore the length of the period (1/f) is approximately inversely proportional to the output voltage.

Figure 7:
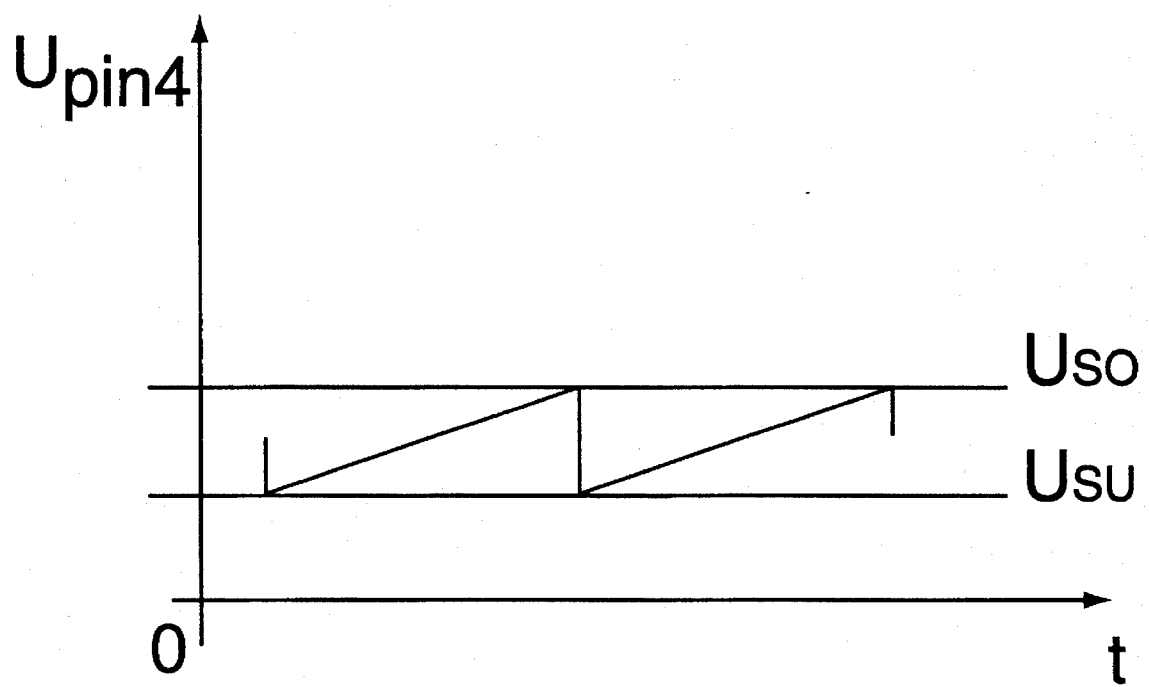
FIG. 7 illustrates a voltage variation at Pin 4 of the circuit, as shown in FIG. 6.

The variation of the voltage on pin 4 of the IC of FIG. 6 is shown in FIG. 7.

What is claimed is:

1. A flyback converter comprising:
   a transformer with a primary winding and at least one secondary winding;
   a driving circuit;
   a switch being driven by the driving circuit for applying an input direct voltage to the primary winding, the switch being driven at a clock frequency and with a duty factor;
   a rectifier coupled to a load capacitor downstream from the secondary winding for generating an output direct voltage, the output direct voltage having an output voltage set value for deriving a deviation voltage; and
   a current sensor for measuring a primary current flowing through the primary winding, the current sensor including a current sensor output signal for controlling the duty factor of the driven switch, the duty factor also being controlled by the deviation voltage of the output direct voltage,
   wherein:
   the output direct voltage is regulated while the primary current is less than a predetermined maximum primary current value,
   the driver circuit includes a voltage/frequency converter to which a converter voltage is applied, the converter voltage being proportional to the output direct voltage, and
   the clock frequency decreases as a function of the output direct voltage when the primary current exceeds the predetermined maximum primary current value and when the load increases.

2. The flyback converter according to claim 1, wherein the transformer includes an auxiliary winding, a rectifier and a capacitor coupled downstream for obtaining a rectification voltage proportional to the output direct voltage.

3. The flyback converter according to claim 1, wherein the driving circuit includes a flip-flop coupled upstream from the driven switch, the flip-flop including a reset input and a set input, the set input being coupled to a converter output of the voltage/frequency converter.

4. The flyback converter according to claim 3, wherein the driving circuit includes an operational amplifier having a first amplifier input, a second amplifier input and an amplifier output, the current sensor output signal of the current sensor being provided to the first amplifier input, and the deviation voltage of the output direct voltage being provided to the second amplifier input, the amplifier output being coupled to the reset input of the flip-flop.

5. The flyback converter according to claim 3, wherein the driving circuit includes a current comparator having a first current comparator input, a second current comparator input and a current comparator output, the predetermined maximum primary current value being provided to the first current comparator input, the current sensor output signal of the current sensor being provided to the second current comparator input, the current comparator output being coupled to the reset input of the flip-flop.

6. The flyback converter according to claim 5, further comprising a saw-tooth generator having a clock frequency and a saw-tooth output signal, wherein the driving circuit includes a voltage comparator having a first voltage comparator input, a second voltage comparator input and a voltage comparator output, the saw-tooth output signal being provided to the first voltage comparator input, the deviation voltage of the output direct voltage being provided to the second voltage comparator input, and wherein the flip-flop includes a second reset input being coupled to the voltage comparator output.

7. The flyback converter according to claim 1, further comprising:
   a resistor;
   a capacitor having a first end and a second end; and
   an integrated circuit including at least one flip-flop, the comparator and a controlled oscillator, the integrated circuit including a control input,
   wherein the control input is coupled to the resistor for receiving one of the output direct voltage and the auxiliary winding voltage through the resistor, and the control input being coupled to the first end of the capacitor, the second end of the capacitor being coupled to a ground.

* * * * *